United States Patent
Hopkins (10) Patent No.: US 9,172,802 B1
(45) Date of Patent: *Oct. 27, 2015

(54) SYSTEMS AND METHODS FOR REESTABLISHING TERMINATED TELEPHONE CALLS WITH AN INTERACTIVE VOICE RESPONSE (IVR) SYSTEM

(71) Applicant: United Services Automobile Association, San Antonio, TX (US)

(72) Inventor: John C. Hopkins, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/457,844

(22) Filed: Aug. 12, 2014

Related U.S. Application Data (63) Continuation of application No. 12/259,413, filed on Oct. 28, 2008, now Pat. No. 8,804,944.

(51) Int. Cl.
*H04M 3/00* (2006.01)
*H04M 3/493* (2006.01)
*H04M 3/523* (2006.01)

(52) U.S. Cl.
CPC .............. *H04M 3/493* (2013.01); *H04M 3/523* (2013.01)

(58) Field of Classification Search
CPC ... H04M 3/51; H04M 3/5166; H04M 3/5175; H04M 3/5183; H04M 3/5191; H04M 3/523; H04M 3/5233; H04M 2203/2011; H04M 2203/40; H04M 2203/402; H04M 2203/407; H04M 2203/408; H04M 3/493
USPC ................... 379/88.16, 88.17, 88.18, 265.01, 379/265.02, 265.1, 265.11, 265.13, 266.01, 379/266.06, 265.09

See application file for complete search history.

(56) References Cited

U.S. PATENT DOCUMENTS

| | | | | |
|---|---|---|---|---|
| 6,411,805 B1* | 6/2002 | Becker et al. | ............. | 455/414.1 |
| 6,826,194 B1* | 11/2004 | Vered et al. | .................. | 370/449 |
| 6,975,720 B1* | 12/2005 | Crook | ..................... | 379/266.01 |
| 8,804,944 B1* | 8/2014 | Hopkins | ................. | 379/266.01 |

* cited by examiner

*Primary Examiner* — Antim Shah
(74) *Attorney, Agent, or Firm* — Kane Kessler, P.C.; Barry E. Negrin (57) ABSTRACT

A system, method, and computer-usable medium are disclosed for improved processing of calls within an interactive voice response (IVR) system. An inbound call comprising a call origination identifier is received by a call processing module, which uses the call origination identifier to retrieve call record and call processing information associated with a prior call session. The call record and call processing information is processed to determine the state of the prior call session and its point of termination when it was terminated. If the point of termination was associated with a human operator, then the call processing module determines whether the same human operator is available. If not, the user is provided a choice of call session options including being placed in a hold queue until the same or another human operator is available, requesting a return call from a human operator, or selecting another call session process.

6 Claims, 7 Drawing Sheets

SYSTEMS AND METHODS FOR REESTABLISHING TERMINATED TELEPHONE CALLS WITH AN INTERACTIVE VOICE RESPONSE (IVR) SYSTEM

CROSS REFERENCE TO RELATED APPLICATIONS

Priority is claimed from U.S. patent application Ser. No. 12/259,413, entitled "Systems and Methods for Temporary Call Cache, filed Oct. 28, 2008 and issuing as U.S. Pat. No. 8,804,944 on Aug. 12, 2014, the entirety of which is incorporated by reference herein. Further, the present application is related by subject matter to that disclosed in the following commonly assigned applications, the entireties of which are hereby incorporated by reference herein:

U.S. patent application Ser. No. 12/259,421, now abandoned, entitled "Systems and Methods for Temporary Call Cache", inventor John C. Hopkins, filed on Oct. 28, 2008, describes exemplary methods and systems and is incorporated by reference in its entirety.

U.S. patent application Ser. No. 12/259,431, now abandoned, entitled "Systems and Methods for Temporary Call Cache", inventor John C. Hopkins, filed on Oct. 28, 2008, describes exemplary methods and systems and is incorporated by reference in its entirety.

BACKGROUND

1. Field of the Disclosure

Embodiments of the disclosure relate general to the field of computers and similar technologies, and in particular to software utilized in this field. Still more particularly, it provides a system, method, and computer-usable medium for improved processing of calls within an interactive voice response (IVR) system.

2. Description of the Related Art

Interactive Voice Response (IVR) is a telephony technology that allows a user to navigate through a series of prompts and responses using keypad input or voice response commands. Over the years, there has been widespread adoption of IVR systems, especially in businesses that handle large volumes of incoming calls. The size of known IVR systems range from small to large, and their abilities from simple to complex. In recent years, IVR processes have become more sophisticated, irrespective of their size or complexity, which in some cases has resulted in a corresponding improvement in user experience.

In general, a Computer Telephone Integration (CTI) system is used to identify the Calling Line ID (CLI) of an inbound call. The inbound call is then routed to an IVR system, which in some cases can use the CLI to identify the customer for profile-directed service tailoring. The IVR system queries the customer with a digitally recorded set of questions and the customer's responses are then used to ascertain the appropriate routing for the call. In addition, some IVR systems utilize complex algorithms to determine the most appropriate routing of the call. Once a destination has been determined, the CTI system passes the routing for the call to an Automated Call Distributor (ACD), which in turn connects the customer with the intended recipient or customer hold queue.

While IVR systems typically enhance the customer service experience, they are not without their limitations. Unexpected user input or responses, line faults, and operator errors often result in premature termination, of the IVR processes and dropped calls, which can be frustrating if the user has experienced a lengthy wait while in the call queue. While many IVR systems routinely store customer information in a buffer or cache for call routing completion, this information is generally lost upon call termination and is unavailable when a customer re-establishes their connection with the IVR system. As a result, customers that have been inadvertently or prematurely disconnected from the IVR system do not have the ability to resume their prior IVR process at the point of termination. Furthermore, not only do they lose their priority in a call queue, they are typically unable to re-establish a call session with the customer support representative they were speaking with.

BRIEF SUMMARY

A system, method, and computer-usable medium are disclosed for improved processing of calls within an interactive voice response (IVR) system. In various embodiments, an inbound call is received from a user by a computer telephony integration (CTI) system, which comprises an IVR system, a call processing module, and call processing information. In various embodiments, the inbound call comprises a call origination identifier. In one embodiment, a database of call processing information comprises an index cross-referencing the call origination identifier to the cull processing information. In one embodiment, the call processing module uses the call origination identifier to retrieve the call record and call processing information associated with a prior call session.

Once retrieved, the call record and call processing information is processed by the call processing module to determine the state of the prior call session when it was terminated. The call processing module then initiates a prioritized call session and assigns a prioritization status to the call record associated with the prior call session. The call record and associated call processing information is then further processed by the call processing module to determine the point of termination for the prior call session. If the point of termination for the prior call session was associated with a human operator, then the call processing module determines whether the same human operator is available to resume a call session with the user. If not, then the user is provided a choice of call session options. In various embodiments, the user can elect to being placed in a hold queue until the same or another human operator is available, request a return call from the human operator, or select another call session process.

If the user chooses not to resume a prior call session, then a new call session is initiated and associated with a new call record. User input and the slate of the new call session are then stored in the call processing information database and the user is placed in a queue for the selected call session activity by the call processing module. If the call session is terminated, then user input and call session state is updated in the call processing information. In various embodiments, the user is able to access the call processing module through a user interface (UI), respectively implemented on the user's system or mobile device, to access the IVR system and choose a call routing option. Once chosen, a call session is automatically established by the call processing module and the user is placed at a predetermined position within the chosen call routing option.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

A method, system and computer-usable medium are disclosed for improved processing of calls within an interactive voice response (IVR) system. As will be appreciated by one skilled in the art, the disclosure may be embodied as a method, system, or computer program product. Accordingly, various embodiments may be implemented entirely in hardware, entirely in software (including firmware, resident software, micro-code, etc) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
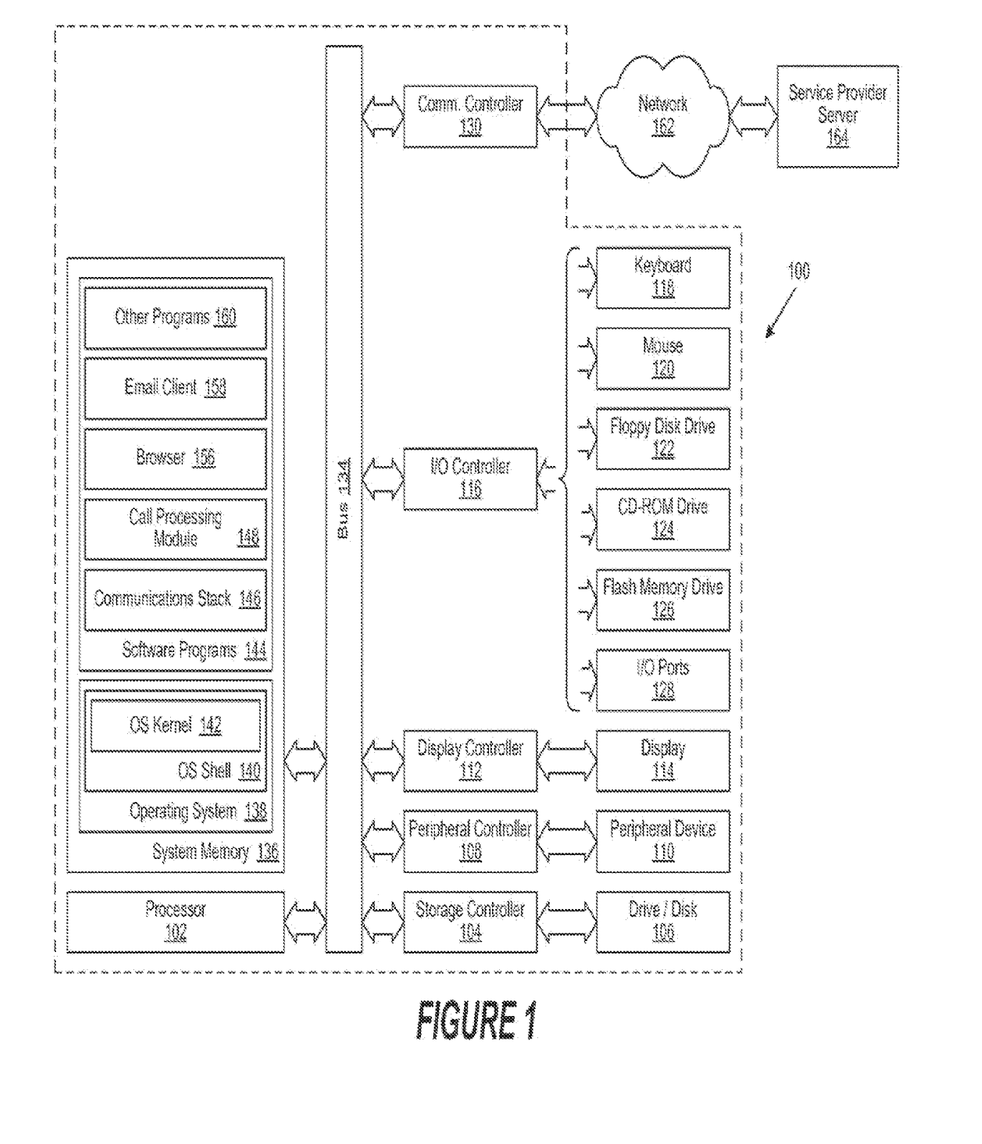
FIG. 1 depicts an exemplary client information processing system (IPS) in which embodiments of the disclosure may be implemented.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk—Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the internet using HyperText Transfer Protocol (HTTP) messaging, thus enabling communication with service provider server 164.

Software programs 144 also include a call processing module 148. The call processing module 148 includes computer executable instructions for implementing the processes described in FIGS. 2-3 described hereinbelow. In one embodiment, client IPS 100 is able to download the computer executable instructions of the call processing module 148 from a service provider server 164 located at a remote location. In another embodiment, the computer executable instructions of the call processing module 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
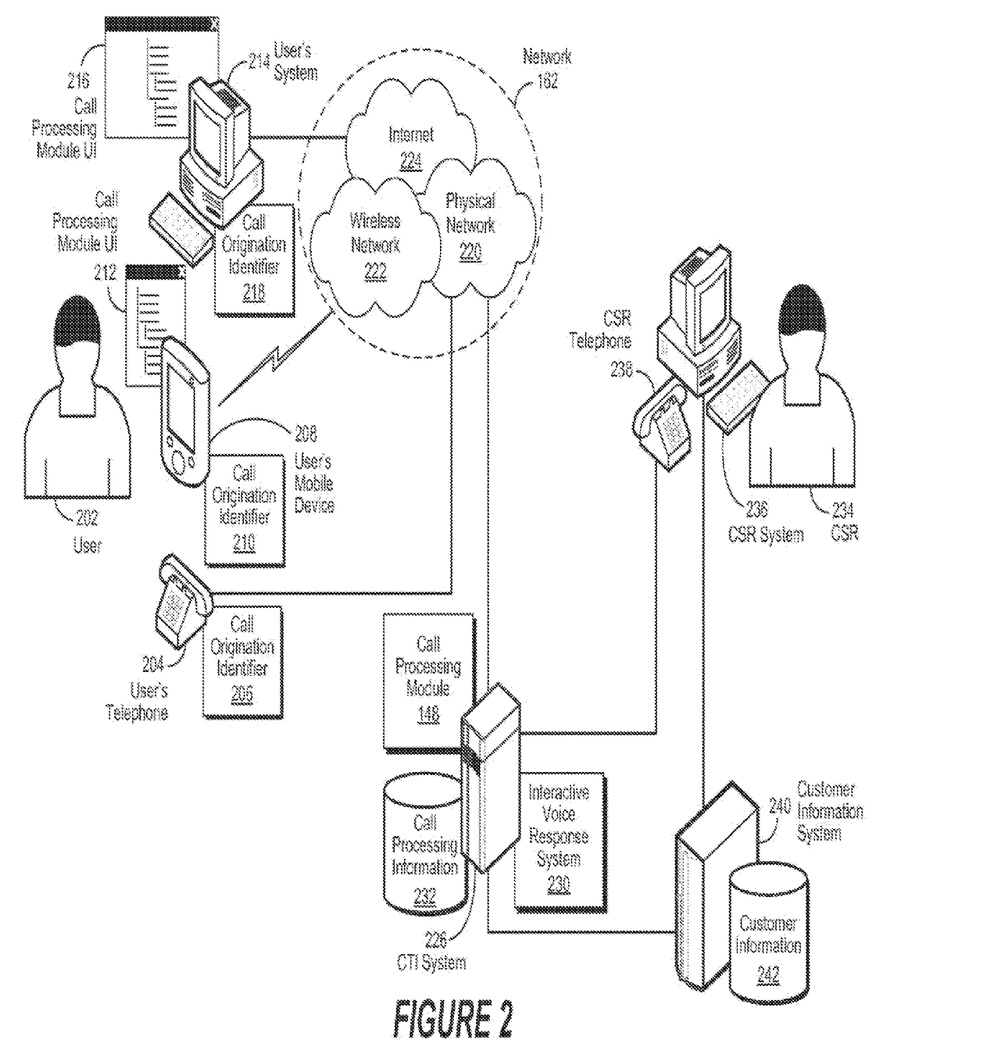
FIG. 2 is a simplified block diagram of a call processing module as implemented in an embodiment of the disclosure.
Figure 3A:
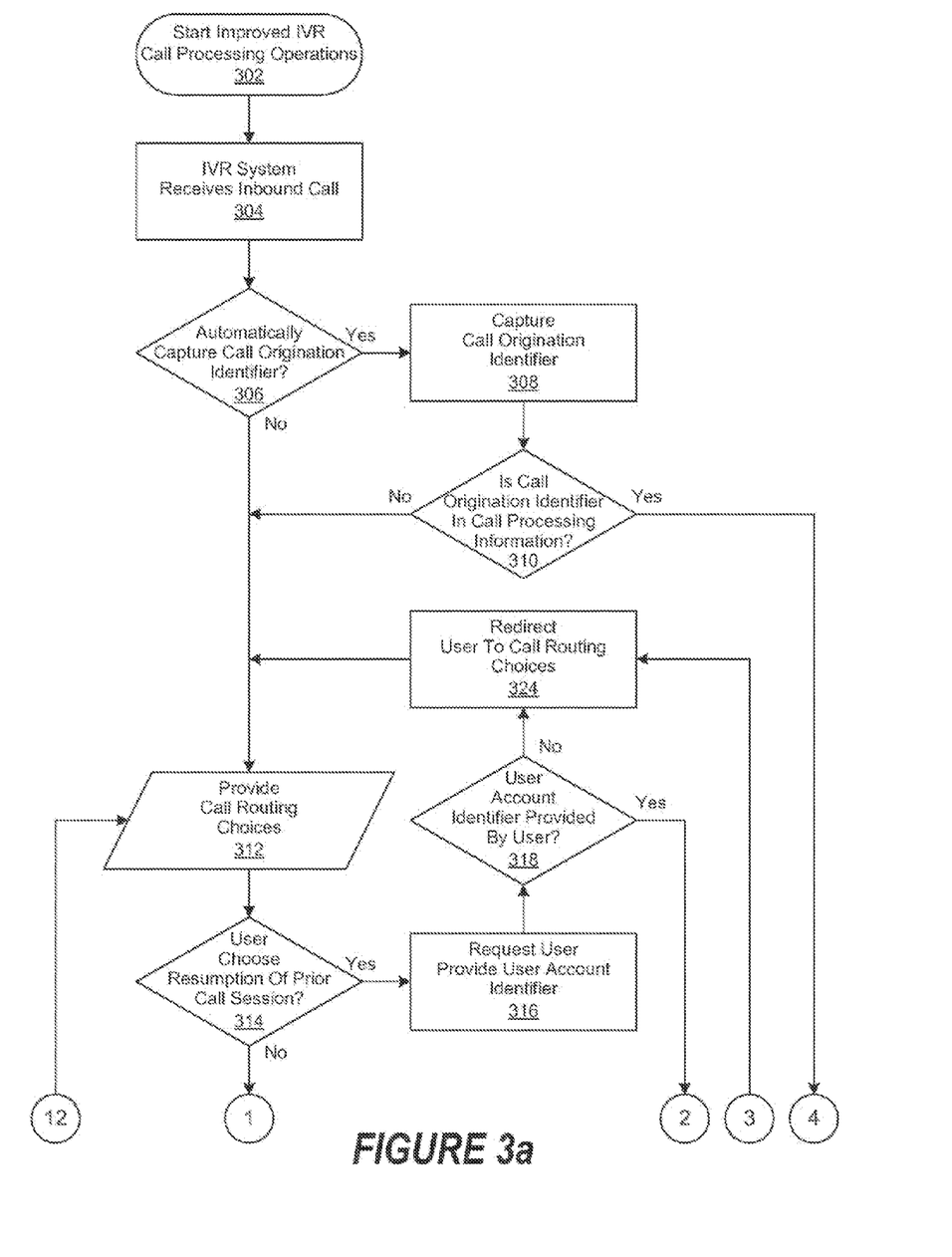
FIGS. 3a-e are a generalized flowchart of the operation of a call processing module as implemented in an embodiment of the disclosure.

FIG. 2 is a simplified block diagram of a call processing module as implemented in an embodiment of the disclosure. In various embodiments, a call processing module 148 is implemented with a computer telephony integration (CTI) system 226 for improved processing of calls within an interactive voice response (IVR) system 230. In these and other embodiments, an inbound call is received from a user 202 by the CTI system 226, which comprises an IVR system 230. The CTI system 226 further comprises a call processing module 148 and call processing information 232.

In one embodiment, a call origination identifier 206, 210, 218 is associated with the inbound call. In one embodiment, the call origination identifier 206, 210, 218 is an automatic number identification (ANI) 206 associated with an originating telephone number assigned to the user's telephone 204, which originates the inbound call over a physical network 222. In another embodiment, the call origination identifier is an international mobile equipment identity (IMEI) 208 associated with the user's mobile device 208, which originates the inbound call over a wireless network 222. In yet another embodiment, the call origination identifier 218 is an Internet Protocol (IP) address associated with the user's information processing system (IPS) 214. As an example, the IPS may be implemented with voice over IP (VoIP) capabilities for conducting a voice communication session over an IP network, such as the Internet 224. In these embodiments, network 162 comprises the physical network 220, the wireless network 222, and the Internet 224, all of which are interconnected.

Once captured, the call processing module 148 determines whether the call origination identifier is contained in the database of call processing information 232. In one embodiment, the database of call processing information 232 comprises an index cross-referencing the call processing information 232 to call origination identifiers. If the call origination identifier is not in the database of call processing information 232, then the user 202 is provided call routing choices by the IVR system 230. In one embodiment, the user 202 selects a call routing choice associated with resuming a prior call session. The user 202 is then requested to provide a user account identifier, such as an account number. In one embodiment, the call origination identifier comprises a user account identifier.

If the user account identifier is stored in the database of call processing information 232, then it is used to retrieve the call record and call processing information associated with the prior call session. Once retrieved, the call record and call processing information associated with the prior call session is processed by the call processing module 148 to determine the state of the prior call session when it was terminated. If it is determined that the prior call session was terminated prematurely, then a prioritized call session is initiated for the user 202 and a prioritization status, such as a flag, is assigned to the call record associated with the prior call session. As an example, the user 202 may have been in the process of providing information to a customer service representative (CSR) 234 for an insurance claim during a call session, but not all of the information was available to the user. The call session, was terminated with an agreement between the user 202 and the CSR 234 that the user 202 would call back with the missing information. The CSR 234 then places a prioritization on the call record associated with the call session so the process of filing the insurance claim could be resumed at the same point of the process when the user 202 calls back.

Once the call session has been prioritized, the call record and associated call processing information corresponding to the call session is further processed to determine the point of termination for the prior call session. If it is determined that the point of termination for the prior call session was associated with a CSR 234, then the call processing module 148 determines whether the same CSR 234 is available to resume a call session with the user 202. If not, then the user 202 is provided a choice of call session options. In one embodiment, the user 202 can elect to being placed in a hold queue until the CSR 234 is available. In another embodiment, the user 202 can elect to being placed in a hold queue until another CSR 234 is available. In yet another embodiment, the user 202 can elect to provide call-back information and request a return call from the CSR 233. In still another embodiment, the user 202 can elect to select another call session process. As an example, the user 202 may have been in the process of filing an insurance claim when the prior call session was terminated. After calling back in, the user may decide to check their current payment information associated with the insurance policy while waiting for the CSR 234 to become available.

However, if the user 202 chooses not to resume a prior call session, then a new call session is initiated, and once initiated, associated with a now call record. User 202 input and the state of the new call session are then stored in the call processing information database 232 and the user 202 is placed in a queue for the selected call session activity by the call processing module 148. Call session activity is then conducted between the user 202 and the IVR system 230 or the CSR 234. In one embodiment, call session activity is conducted between the user 202 and the CSR 234 using their respective telephones 204, 238 through a connection to the CTI system 226. In another embodiment, the IVR system 230 accesses customer information 242 through the CTI system 230 which, is coupled to the customer information system 240, which in turn comprises the customer information 242. In yet another embodiment, the CSR 234 accesses customer information 242 through the customer information system 240, which in turn comprises the customer information 242.

If the call session is terminated, then user 202 input and call session state is updated in the call processing information 232. As an example, the CSR may update the call processing information to reflect that the call session was prematurely terminated along with information related to the point in the call session where the termination occurred. In one embodiment, the user 202 is able to access the call processing module 148 through a user interface (UI) 216, 212, respectively implemented on the user's system 214 or mobile device 212 to access call routing options as described in greater detail herein. In this embodiment, the user 202 can navigate the IVR system and choose a call routing option. Once chosen, a call session is automatically established by the call processing module 148 to place the user 202 within the selected position of a process provided by the IVR system 230.

FIGS. 3a-e are a generalized flowchart of the operation of a call processing module as implemented in an embodiment of the disclosure. In various embodiments, a call processing module is implemented for improved processing of calls within an interactive voice response (IVR) system. In this embodiment, improved IVR call processing operations are begun in block 302, followed by the receipt of an inbound call from, a user by an IVR system in block 304. A determination is then made in block 306 whether to automatically capture a call origination identifier associated with the inbound call. In one embodiment, the call origination identifier is an automatic number identification (ANI) associated with an originating telephone number. In another embodiment, the call origination identifier is an international mobile equipment identity (IMEI) associated with a mobile device. In yet another embodiment, the call origination identifier is an internet Protocol (IP) address associated with an information processing system (IPS). As an example, the IPS may be implemented with voice over IP (VoIP) capabilities for conducting a voice communication session over an IP network.

If it is determined in block 306 to automatically capture the call origination identifier, then it is captured in block 308, followed by a determination in block 310 whether the call identifier is stored in a database of call processing information. In one embodiment, the database of call processing information comprises m index cross-referencing call processing information to call origination identifiers.

If it is determined in block 310 that the call origination identifier is not in the database of call processing information, or if it was determined in block 306 to not automatically capture a call origination, identifier, then the user is provided call routing choices by the IVR system in block 312. A determination is then made in block 314 whether the user selects a call routing choice associated with resuming a prior call session. If so, then the user is requested in block 316 to provide a user account identifier, such as an account number. In one embodiment, the call origination identifier comprises a user account identifier. A determination is then made in block 318 whether the user account identifier has been provided by the user. If not, then the user is redirected in block 324 to the call routing choices and the process continues, proceeding with block 312. Otherwise, a determination is made in block 320 whether the user account identifier is stored in the database of call processing information. If not, then the user is notified in block 322 that the call record associated with the prior call session cannot be located and they will be re-routed to the available call routing options. The user is then redirected in block 324 to the call routing choices and the process continues, proceeding with block 312. However, if the user account identifier is stored in the database of call processing information, then it is used in block 326 to retrieve the call record and call processing information associated with the prior call session. However, if it is determined in block 310 that the call origination identifier is in the database of call processing information, then it is used in block 328 to retrieve the call record and call processing information associated with the prior call session. Once the call record and call processing information associated with the prior call session has been retrieved in block 326 or block 328, it is processed by the call processing module in block 330 to determine the state of the prior call session when it was terminated.

Figure 3B:
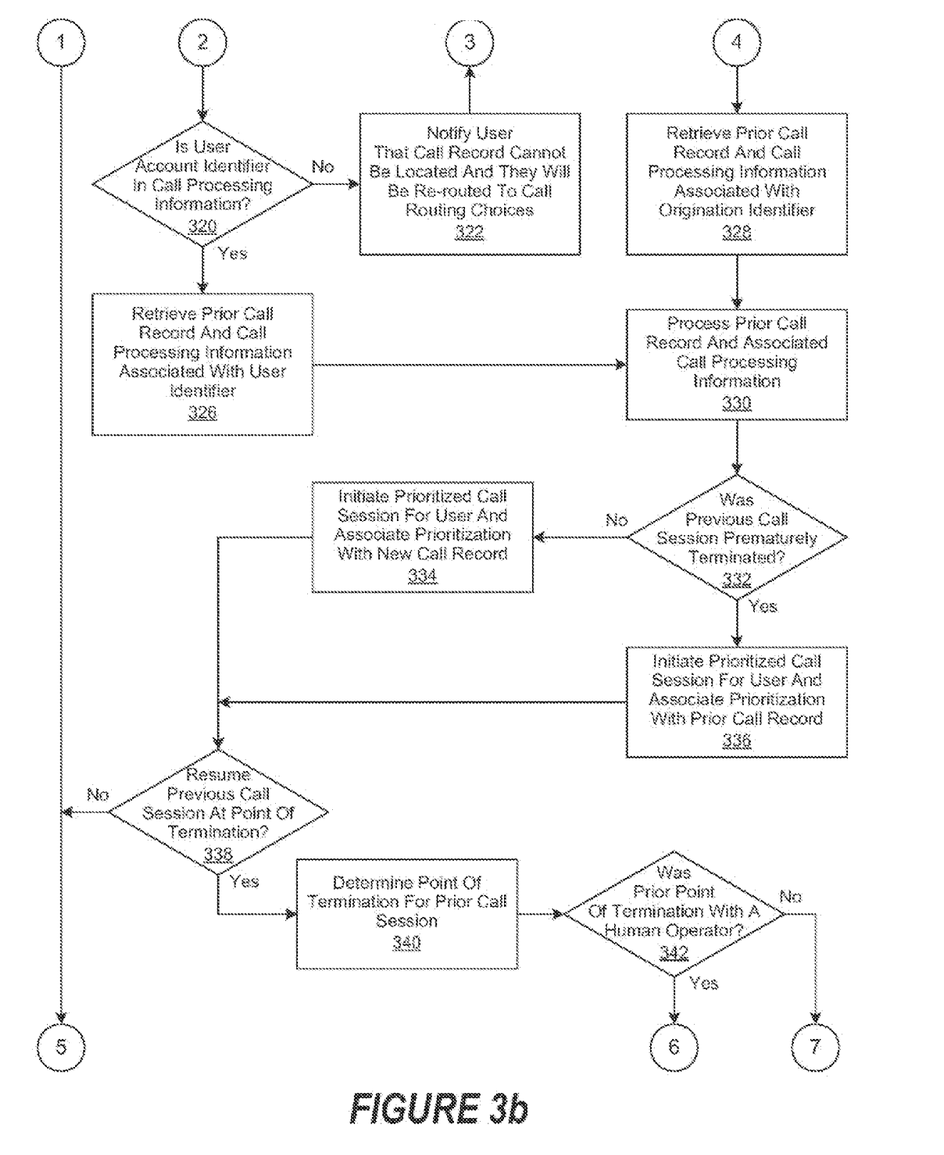

The processed call record and call processing information associated with the prior call session is then used to make a determination in block 330 whether the prior call session was terminated prematurely. If so, then a prioritized call session is initiated for the user in block 336 and a prioritization status, such as a flag, is assigned to the call record associated with the prior call session. Otherwise, a prioritized call session is initiated for the user in block 338 and a prioritization status, such as a flag, is assigned to a new call record. As an example, a user may have been in the process of providing information to a customer service representative (CSR) for an insurance claim during a call session, but not all of the information was available to the user. The call session was terminated with an agreement between the user and the CSR that the user would call back with the missing information. The CSR then places a prioritization on the call record associated with the call session so the process of filing the insurance claim could be resumed at the same point of the process when the user calls back.

Once the call session has been prioritized in block 334 or block 336, a determination is made in block 338 whether the call session is to be resumed at its prior point of termination. If so, the call record and associated call processing information corresponding to the call session is further processed in block 340 to determine the point of termination for the prior call session. A determination is then made in block 342 to determine whether the point of termination for the prior call session was associated with a human operator, such as a CSR. If so, then a determination is made in block 344 to determine whether the human operator is available to resume a call session with the user. If not, then the user is provided a choice of call session options in block 348. In one embodiment, the choice of call sessions options comprises the user being placed in a hold queue until the human operator is available. In another embodiment, the choice of call sessions options comprises the user being placed in a hold queue until another human operator is available. In yet another embodiment, the choice of call sessions options comprises the user providing call-back information and requesting a return call from a human operator. In still another embodiment, the choice of call sessions options comprises the user selecting another call session process. As an example, the user may have been in the process of filing an insurance claim when the prior call session was terminated. After calling back in, the user may decide to check their current payment information associated with the insurance policy while waiting for the CSR to become available.

Figure 3C:
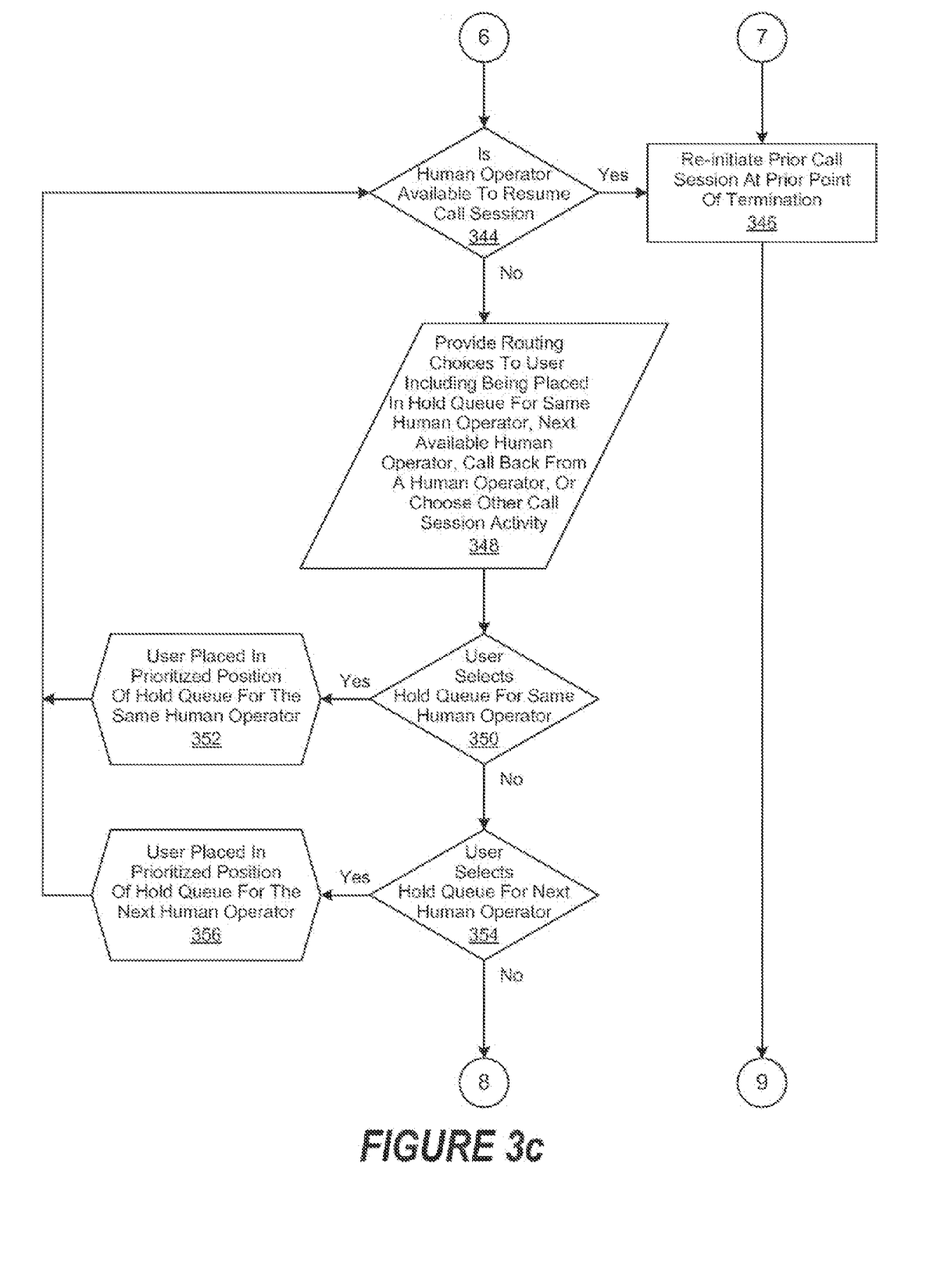

A determination is then made in block 350 whether the user has selected a call session option associated with the user being placed in a hold queue until the same human operator is available. If so, then the user is placed in a prioritized position of a hold queue for the same human operator in block 352 and the process continues, proceeding with block 344. If not, then a determination is made in block 354 whether the user has selected a call session option associated with the user being placed in a hold queue until the next human operator is available. If so, then the user is placed in a prioritized position of a hold queue for the next human operator in block 356 and the process continues, proceeding with block 344. If not, then a determination is made in block 358 whether the user has selected a call session option associated with the user requesting a return call from a human operator. If so, then the user provides call-back information in block 360, which is used to update the call record associated with the current call session. If not, or once the call record has been updated in block 360, a determination is made in block 362 whether the user has selected a call session option associated with another call session activity. If not, then improved IVR call processing operations are ended in block 394.

Figure 3D:
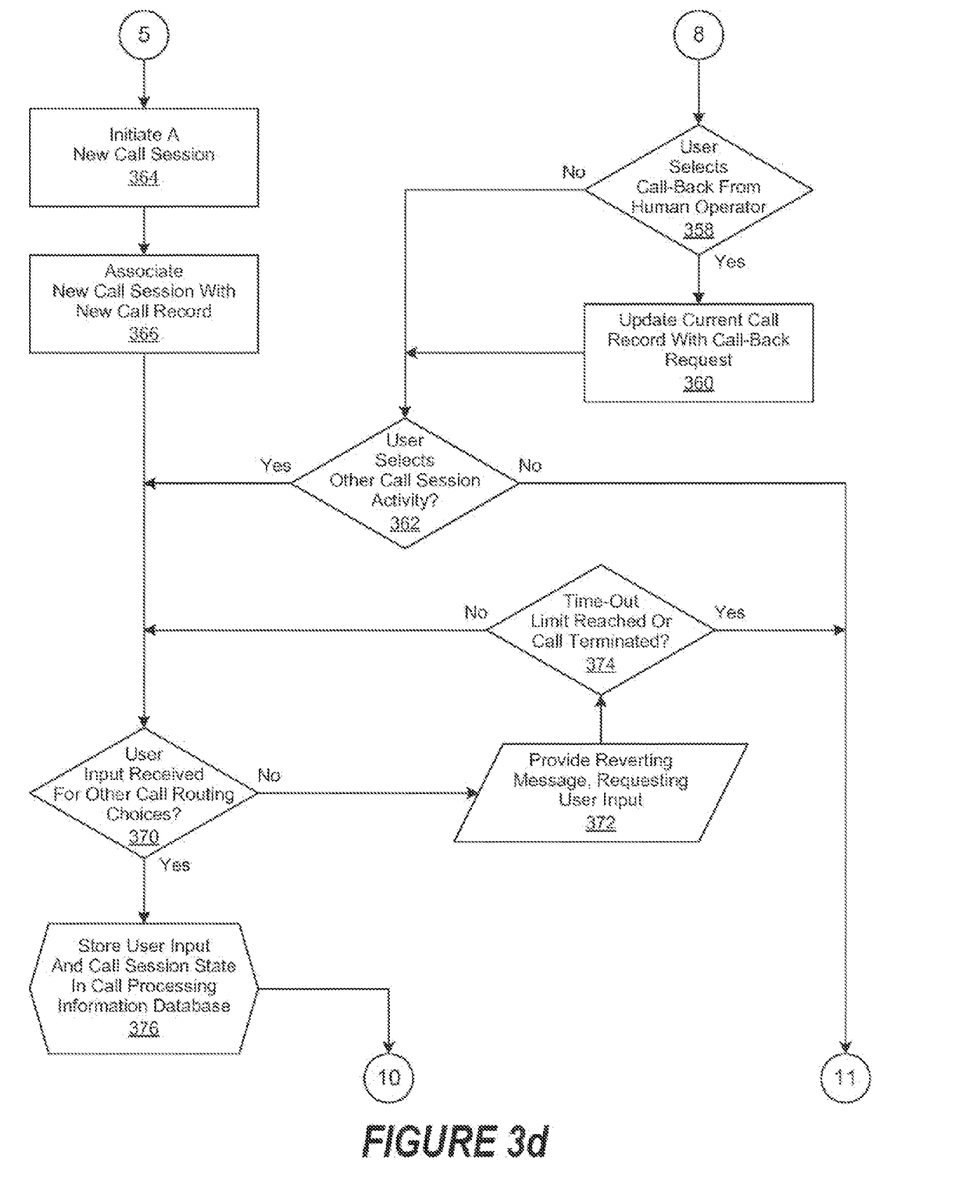

However, if it is determined in block 314 that the user chooses not to resume a prior call session, then a new call session is initiated in block 364 and the new call session is associated with a new call record in block 366. Once the new call session is associated with a new call record, or if it is determined in block 362 that the user selects another call session activity, then a determination is made in block 370 whether user input is received for other call routing options. If not, then a reverting message is provided to the user in block 372, requesting user input for other call routing options. A determination is then made in block 374 whether a time-out limit has been reached for user input or the call session has been terminated. If so, then improved IVR call processing operations are ended in block 394. Otherwise, the process continues, proceeding with block 370. User input and the state of the new call session are then stored in the call processing information database in block 376 and the user is placed in a queue for the selected call session activity in block 380.

Figure 3E:
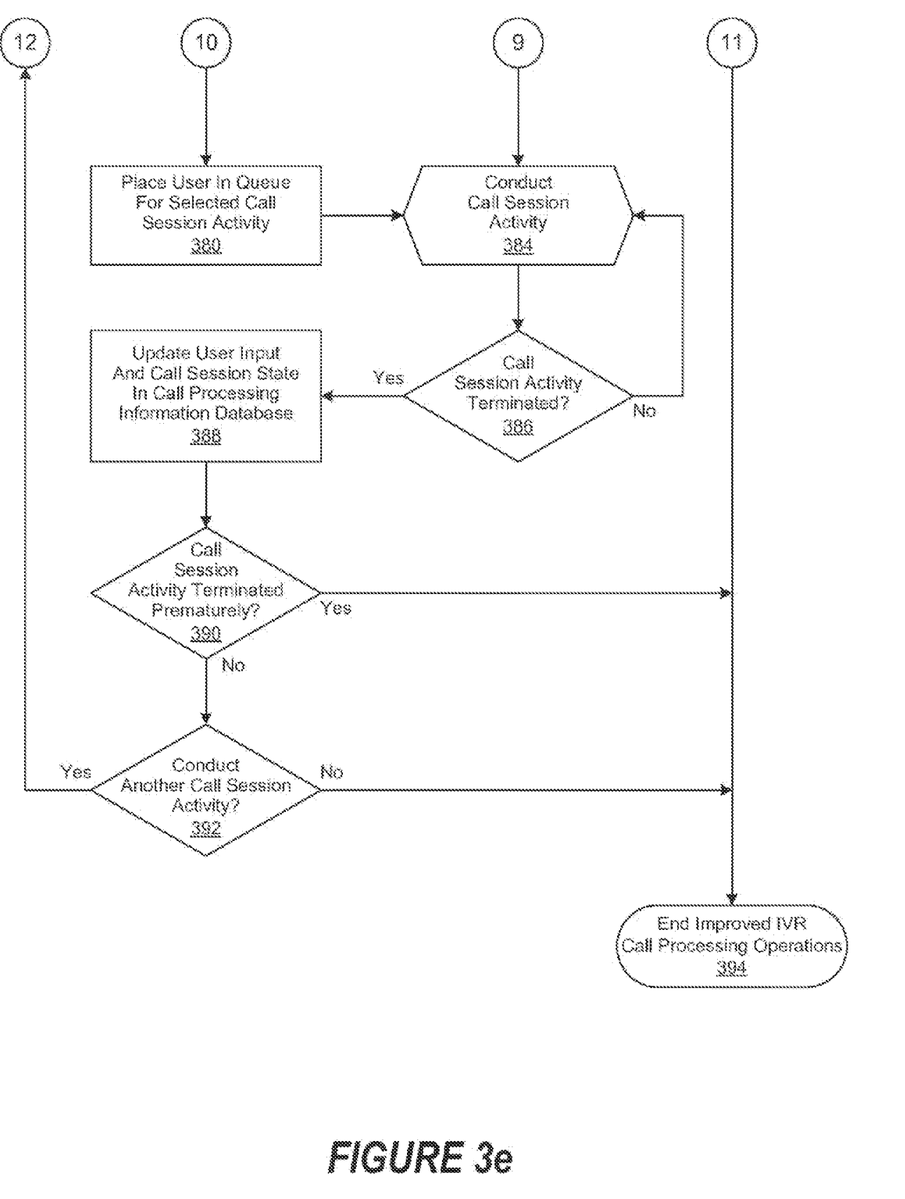

However, if it is determined to block 342 the point of termination for the prior call session was not with a human operator, or if it is determined in block 344 that the human operator is available, then the prior call session is reinitiated at the prior point of termination in block 346. Once the call session is reinitiated at the prior point of termination in block 346, or the user is placed in a queue for the selected call session activity in block 380, then call session activity is conducted in block 384. A determination is then made in block 386 whether the call session has terminated. If not, the process continues, proceeding with block 384. Otherwise, user input and call session state is updated in the call processing information database in block 388. As an example, the CSR may update the call processing information to reflect that the call session was prematurely terminated along with information related to the point in the call session where the termination occurred. A determination is then made in block 390 whether the call session activity terminated prematurely. If so, then improved IVR call processing operations are ended in block 394. Otherwise, a determination is made in block 392 whether to conduct another call session activity. If so, the process continues, proceeding with block 312. Otherwise, improved IVR call processing operations are ended in block 394.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, these skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in ail respects.

What is claimed is:

1. A system for reestablishing terminated telephone calls with an interactive voice response (IVR) system, comprising:
    a database comprising call processing information indexed to a call origination identifier; and
    a call processing module operable to process said call processing information to, upon reconnection, determine at least one of i) a position of a user's previously terminated call session within a first IVR process or ii) the identity of a customer service representative (CSR) to whom the user was communicating during the previously terminated call session, said call processing module being further operable to use said call origination identifier to identify the user upon reconnection and to use said call processing information to at least one of i) automatically re-establish the user's position within the IVR process or ii) re-establish communication with the CSR;
    wherein, when the CSR is unavailable upon reconnection of the terminated call, said call processing module offers the user the option to request routing to a second IVR process; and
    wherein, when the CSR is unavailable upon reconnection of the terminated call and the user has opted to request the second IVR process, upon completion of the second IVR process, the user is rerouted to the first IVR process and the user is placed in a next available position of a hold queue until the CSR is available.

2. A system for reestablishing terminated telephone calls with an interactive voice response (IVR) system according to claim 1, wherein when the user is rerouted to the first IVR process, the user's position within the first IVR process as determined by said call processing module is re-established.

3. A computer-implementable method for reestablishing terminated telephone calls with an interactive voice response (IVR) system, comprising the steps of:
    providing a database comprising call processing information indexed to a call origination identifier;
    determining, upon reconnection, via a call processing module operable to process said call processing information, at least one of i) a position of a user's previously terminated call session within a first IVR process or ii) the identity of a customer service representative (CSR) to whom the user was communicating during the previously terminated call session;
    using said call origination identifier to identify the user upon reconnection; and
    using said call processing information to at least one of i) automatically re-establish the user's position within the IVR process or ii) re-establish communication with the CSR;
    further comprising the step of, when the CSR is unavailable upon reconnection of the terminated call, offering the user the option to request routing to a second IVR process; and
    further comprising the steps of, when the CSR is unavailable upon reconnection of the terminated call and the user has opted to request the second IVR process, upon completion of the second IVR process:
    rerouting the user to the first IVR process; and
    placing the user in a next available position of a hold queue until the CSR is available.

4. A computer-implementable method for reestablishing terminated telephone calls with an interactive voice response (IVR) system according to claim 3, further comprising the step of re-establishing the user's position within the first IVR process as determined by said call processing module when the user is rerouted to the first IVR process.

5. A non-transitory computer-usable medium embodying computer program code for reestablishing terminated telephone calls with an interactive voice response (IVR) system, the computer program code comprising computer executable instructions configured for:
    providing a database comprising call processing information indexed to a call origination identifier;
    determining, upon reconnection, via a call processing module operable to process said call processing information, at least one of i) a position of a user's previously terminated call session within a first IVR process or ii) the identity of a customer service representative (CSR) to whom the user was communicating during the previously terminated call session;

using said call origination identifier to identify the user upon reconnection: and using said call processing information to at least one of i) automatically re-establish the user's position within the IVR process or ii) re-establish communication with the CSR.

the computer program code further comprising computer executable instructions configured for, when the CSR is unavailable upon reconnection of the terminated call, offering the user the option to request routing to a second IVR process; and the computer program code further comprising computer executable instructions configured for, when the CSR is unavailable upon reconnection of the terminated call and the user has opted to request the second IVR process, upon completion of the second IVR process:
rerouting the user to the first IVR process; and
placing the user in a next available position of a hold queue until the CSR is available.

6. A non-transitory computer-usable medium embodying computer program code for reestablishing terminated telephone calls with an interactive voice response (IVR) system according to claim 5, the computer program code further comprising computer executable instructions configured for re-establishing the user's position within the first IVR process as determined by said call processing module when the user is rerouted to the first IVR process.

\* \* \* \* \*